United States Patent
Walker et al.

(10) Patent No.: US 10,026,236 B2
(45) Date of Patent: Jul. 17, 2018

(54) METHODS AND SYSTEMS OF USING VEHICLE SYSTEM DATA TO IMPROVE THE OPERATION OF OFF-ROAD VEHICLES

(71) Applicant: Freeport-McMoRan Inc., Phoenix, AZ (US)

(72) Inventors: Mary Amelia Walker, Phoenix, AZ (US); D. Bradley Brown, Phoenix, AZ (US); Don Robert Manifee, Phoenix, AZ (US); Connie DeeAnne Puckett, Phoenix, AZ (US)

(73) Assignee: Freeport-McMoRan Inc., Phoenix, AZ (US)

( * ) Notice: Subject to any disclaimer, the term of this patent is extended or adjusted under 35 U.S.C. 154(b) by 0 days.

(21) Appl. No.: 15/651,119

(22) Filed: Jul. 17, 2017

(65) Prior Publication Data

US 2018/0018834 A1    Jan. 18, 2018

Related U.S. Application Data

(60) Provisional application No. 62/363,503, filed on Jul. 18, 2016.

(51) Int. Cl.
  *G07C 5/00*   (2006.01)
  *G08G 1/00*   (2006.01)
  *G06Q 10/06*  (2012.01)
  *G06Q 50/30*  (2012.01)

(52) U.S. Cl.
  CPC ......... *G07C 5/008* (2013.01); *G06Q 10/0639* (2013.01); *G06Q 50/30* (2013.01); *G08G 1/20* (2013.01); *G05D 2201/0213* (2013.01)

(58) Field of Classification Search
  CPC . B60W 2510/0676; B60W 2510/0638; B60W 2510/0604; B60W 2530/00; B60W 2540/00; B60W 50/00; G07C 5/008
  See application file for complete search history.

(56) References Cited

U.S. PATENT DOCUMENTS

| | | | | |
|---|---|---|---|---|
| 6,836,933 B2* | 1/2005 | Janczak | ............... | E05D 5/0207 16/221 |
| 7,715,961 B1* | 5/2010 | Kargupta | ............... | G06Q 10/08 303/152 |
| 8,948,996 B2* | 2/2015 | Warkentin | ......... | G06Q 10/0639 340/438 |
| 9,922,567 B2* | 3/2018 | Molin | ....................... | G08G 1/20 |
| 2002/0184062 A1* | 12/2002 | Diaz | ..................... | G06Q 10/06 701/29.3 |

* cited by examiner

*Primary Examiner* — John D Walters
*Assistant Examiner* — James J Triggs
(74) *Attorney, Agent, or Firm* — Fennemore Craig, P.C.

(57) ABSTRACT

A method of operating a fleet of off-road vehicles may include: Collecting sensor data from the off-road vehicles, the sensor data being related to the operation of a plurality of vehicle systems; combining sensor data from the vehicle systems in accordance with a user-defined event; determining whether the collected and combined sensor data are within or without defined limits of the user-defined event; producing an alarm signal for a user when the collected and combined sensor data are without the defined limits of the user-defined event; and modifying the operation of vehicles for which an alarm signal has been produced.

9 Claims, 3 Drawing Sheets

METHODS AND SYSTEMS OF USING VEHICLE SYSTEM DATA TO IMPROVE THE OPERATION OF OFF-ROAD VEHICLES

CROSS-REFERENCE TO RELATED APPLICATION

This application claims the benefit of U.S. Provisional Patent Application No. 62/363,503, filed on Jul. 18, 2016, which is hereby incorporated herein by reference for all that it discloses.

TECHNICAL FIELD

The present invention relates to systems and methods of operating vehicles in general and more particularly to systems and methods of improving the operation of a fleet of off-road vehicles by monitoring selected vehicle system data.

BACKGROUND

Mining operations typically utilize fleets of specialized vehicles that are adapted for a wide variety of tasks. Such vehicle fleets, include, for example, off road haul trucks that are used to carry excavated material throughout the mine, although they may include other types of vehicles as well. Such vehicles are often equipped with a vehicle information management system (VIMS) that includes a variety of sensors for sensing information and data relating to the function and operation of the vehicles. Such VIMS systems are often used during vehicle maintenance operations to troubleshoot or identify faulty or failing vehicle components so that the same can be replaced or repaired as necessary.

SUMMARY OF THE INVENTION

One embodiment of a method of improving the operation of a fleet of off-road vehicles may include the steps of: Creating a user-defined event, the user-defined event defining a combination of sensor data relating to at least two vehicle systems or sensors and defined limits for that sensor data, the defined limits and user-defined event being indicative of undesirable operation of the off-road vehicles; collecting sensor data from the vehicles, the sensor data being related to the operation of a plurality of vehicle systems; combining sensor data from the vehicle systems in accordance with the user-defined event; determining whether the collected and combined sensor data are inside or outside the defined limits of the user-defined event; producing an alarm signal for a user when the collected and combined sensor data are outside the defined limits of the user-defined event; and modifying the operation of vehicles for which an alarm signal has been produced.

A method of operating a fleet of off-road vehicles is also disclosed that may include the steps of: Collecting sensor data from the off-road vehicles, the sensor data being related to the operation of a plurality of vehicle systems; combining sensor data from the vehicle systems in accordance with a user-defined event; determining whether the collected and combined sensor data are within or without defined limits of the user-defined event; producing an alarm signal for a user when the collected and combined sensor data are without the defined limits of the user-defined event; and modifying the operation of vehicles for which an alarm signal has been produced.

Also disclosed is a non-transitory computer-readable storage medium having computer-executable instructions embodied thereon that, when executed by at least one computer processor cause the processor to: Collect sensor data from the off-road vehicles, the sensor data being related to the operation of a plurality of vehicle systems; combine sensor data from the vehicle systems in accordance with a user-defined event; determine whether the collected and combined sensor data are within or without defined limits of the user-defined event; produce an alarm signal for a user when the collected and combined sensor data are without the defined limits of the user-defined event; and recommend modification of the operation of vehicles for which an alarm signal has been produced.

A system for operating a fleet of off-road vehicles may include a network. A plurality of sensors operatively associated with the fleet of off-road vehicles and connected to the network sense information related to the operation of a plurality of off-road vehicle systems. A processing system operatively connected to the network is configured to: Collect sensor data from the off-road vehicles, the sensor data being related to the operation of a plurality of vehicle systems; combine sensor data from the vehicle systems in accordance with a user-defined event; determine whether the collected and combined sensor data are inside or outside defined limits of the user-defined event; produce an alarm signal for a user when the collected and combined sensor data are outside the defined limits of the user-defined event; and recommend modification of the operation of vehicles for which an alarm signal has been produced. A display system operatively associated with the processing system displays at least information relating to the recommended modification.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
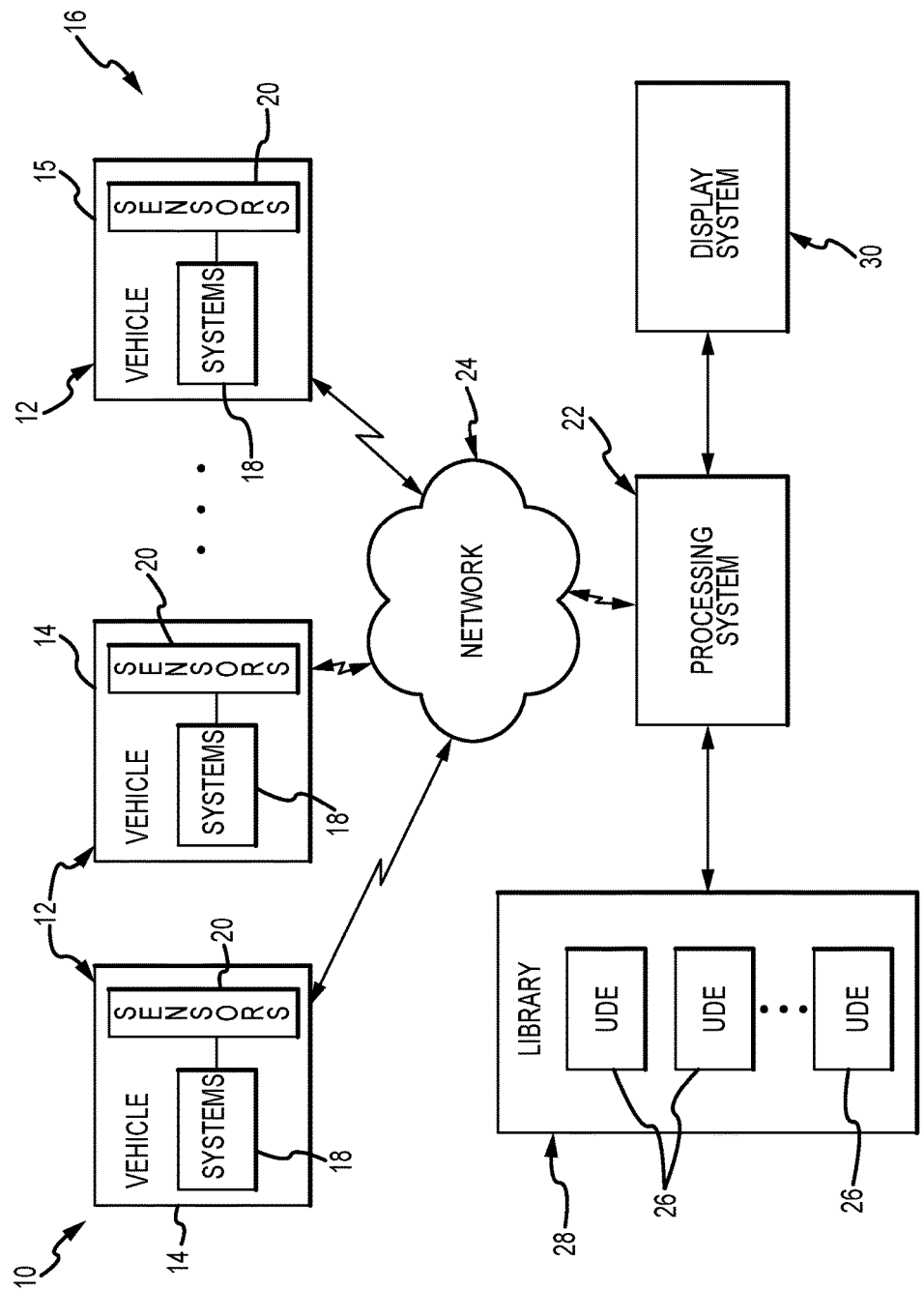
FIG. 1 is a schematic representation of one embodiment of a system for operating a fleet of off-road vehicles according to the present invention.

One embodiment of a system 10 for improving the operation of a fleet of off-road vehicles is illustrated in FIG. 1 and is shown and described herein as it could be used in conjunction with a fleet of off-road vehicles 12, such as haul trucks 14 and wheel loaders 15, operating in a mining environment 16. Various vehicle systems 18 of each off-road vehicle 12 (e.g., haul truck 14 or wheel loader 15) may be provided with one or more sensors 20 for sensing information and data relating to the function and operation of the vehicle systems 18 during operation. Some or all of the sensors 20 may comprise a part of a vehicle information management system (VIMS) provided by the vehicle manufacturer or original equipment manufacturer ("OEM"). Alternatively, some or all of the sensors 20 could be separately provided or added to the vehicles 12 after manufacture.

In any event, and regardless of the particular type of vehicle sensors 20 provided and whether they comprise a portion of the OEM VIMS system, the sensors 20 may be operatively connected to a processing system 22 via a wireless network 24. Processing system 22 may be configured to process information and data from the sensors 20 in accordance with one or more user-defined events ("UDEs") 26. In one embodiment, the user-defined events 26 may be provided in a library 28 of user-defined events.

As will be described in greater detail herein, each user-defined event 26 may comprise a combination of sensor data relating to at least two vehicle systems 18 or two different vehicle sensors 20. The user-defined event 26 may also include defined limits for that sensor data. Sensor data that are outside of the defined limits for the particular user-defined event 26 are indicative of undesirable operation of the off-road vehicle 12. Some user-defined events 26 may comprise combinations of sensor data that are indicative of a mechanical deficiency of the off-road vehicle 12. Other user-defined events 26 may be indicative of an operational deficiency (i.e., improper operator technique or procedure).

Processing system 22 may cause information and data relating to the user defined events 26 to be displayed on one or more display systems 30 operatively associated with processing system 22. For example, and with reference now to FIG. 3, such information and data may include a visual alarm signal 32 that is produced when the collected and combined sensor data are outside of the defined limits of the user-defined event 26. The alarm signal could also comprise an aural signal. The displayed information and data may also include information about whether the alarm signal 32 is indicative of a mechanical deficiency or an operational deficiency. Thereafter, a system operator or fleet manager (not shown) may schedule appropriate maintenance operations and/or operator training, as the case may be.

Figure 2:
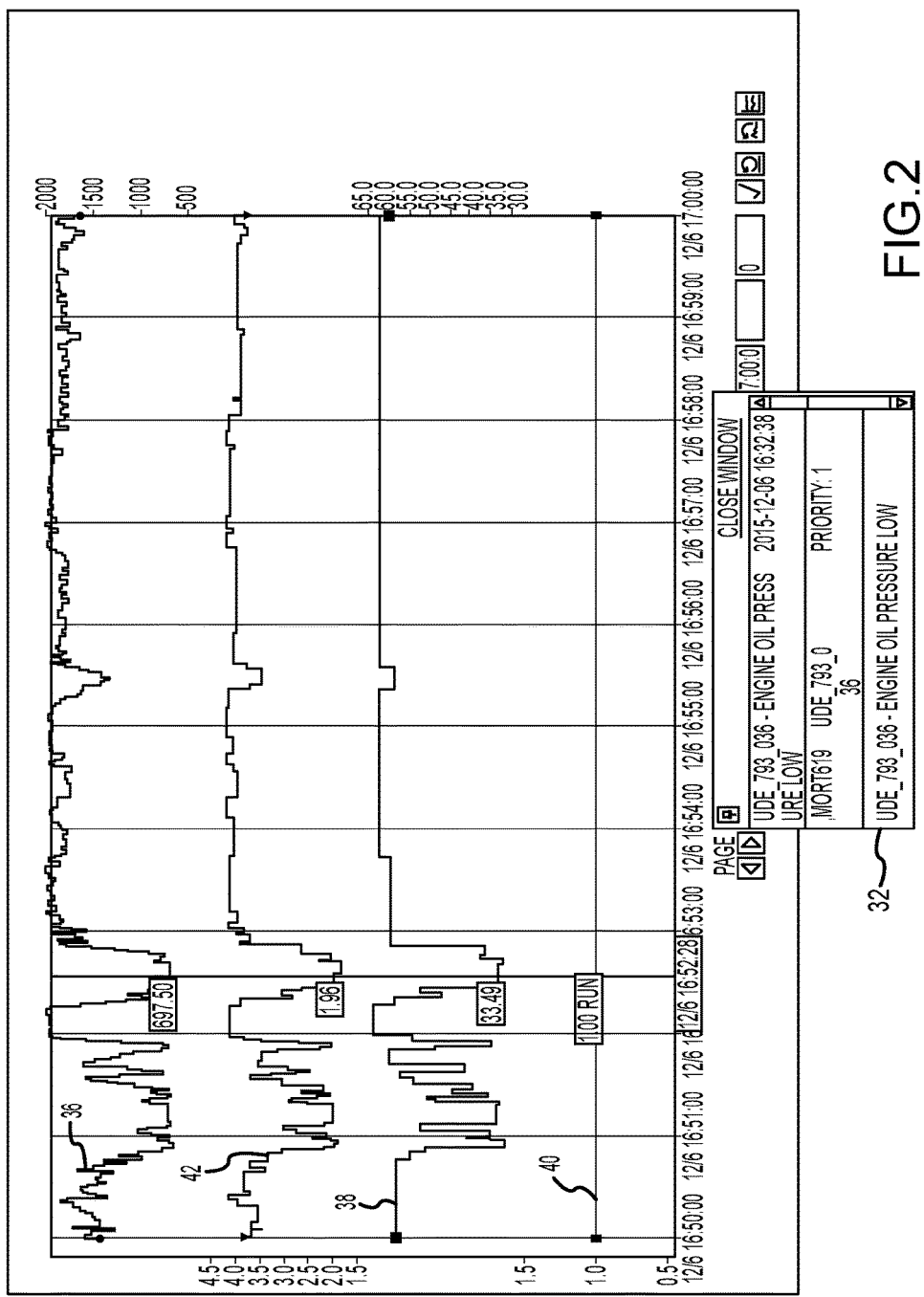
FIG. 2 is a pictorial representation of an example screen display that may be used to show an alarm signal and related vehicle data associated with a low engine oil pressure condition.

In some embodiments, the displayed information may also include one or more data logs 34 of data from the sensor(s) 20 relating to the particular user defined event 26. For example, for the low engine oil pressure user defined event 26 depicted in FIG. 2, data logs 34 may comprise an engine speed or rpm data log 36, an engine oil pressure data log 38, and an engine key switch data log 40 (e.g., engine running or stopped). Data logs 34 may also include a differential pressure data log 42 that indicates a differential pressure (e.g., between inlet and outlet) across an oil filter system of the engine.

A significant advantage of the present invention is that it permits system operators to create or define user defined events that are specific to the particular operational conditions and environments in which the vehicles are operating, rather than just relying on the system alarms and warning systems (e.g., warning lights and/or aural alarms) provided by the vehicle manufacturer. For example, even though a vehicle may be designed for use in a particular environment, such as an open pit mine, not all mining environments are the same. The methods and systems of the present invention will allow mining operators to develop user defined events that are specifically tailored to the conditions of the particular mining environment. Still further, most mining operators have considerable experience operating vehicles and vehicle fleets and often understand the maintenance needs and performance trouble spots of the vehicles themselves better than the vehicle manufacturer. Here again, the systems and methods of the present invention will allow operators to develop user defined events that are specifically tailored to the particular vehicles being used and in view of their actual operational experiences with the particular vehicles involved.

Still other advantages are associated with display of the data logs of sensor data associated with the user defined event 26. For example, upon the determination of an alarm condition, the system user may review the associated data logs and use that information to reach an appropriate resolution of the problem. For example, the data logs may reveal that alarm condition was the result of a system parameter that is only slightly out of the defined range. If so, the system operator may determine that the issue does not require immediate attention. The user may then schedule appropriate remedial measures (e.g., vehicle maintenance) in accordance with a normal or pre-established time line for undertaking such measures. On the other hand, the displayed data logs may reveal that the alarm condition was the result of a serious departure from the defined range for the particular variable. In such an instance, the system operator may choose to take immediate action to address the alarm condition.

Having briefly described certain exemplary embodiments of systems and methods of the present invention, as well as some of their more significant features and advantages, various embodiments and variations of the present invention will now be described in detail. However, before proceeding the description, it should be noted that while various embodiments are shown and described herein as they could be used in conjunction with vehicles used in a mining environment, the present invention is not limited to use with such vehicles and in such environments. For example, while the user defined events are described herein as they could be developed for haul trucks of the type used in open pit mining environments, user defined events could be developed for other types of vehicles operating in other types of environments, as would become apparent to persons having ordinary skill in the art after having become familiar with the teachings provided herein. Consequently, the present invention should not be regarded as limited to use in any particular type of vehicle, environment, or application.

With reference back now to FIG. 1, one embodiment of a system 10 for improving the operation of a fleet of off-road vehicles is shown and described herein as it could be used in conjunction with one or more off-road vehicles 12, such as haul trucks 14 and wheel loaders 15 operating at one or more mine sites 16. Although the vehicles 12 in the exemplary embodiment may comprise off-road haul trucks 14 and wheel loaders 15, it should be understood that the systems and methods of the present invention may be used in conjunction with other types of vehicles, in other environments, and to perform different missions or tasks, as would become apparent to persons having ordinary skill in the art after having become familiar with the teachings provided herein. Consequently, the present invention should not be regarded as limited to any particular vehicle type operating in any particular environment. However, by way of example, in one embodiment, the various haul trucks 14 comprise model 793 (types 'B/C' or 'D') diesel powered off-road haul trucks manufactured by Caterpillar, Inc. of Peoria, Ill. (US). The wheel loaders 15 comprise model 994 (type 'F') diesel powdered wheel loaders, also manufactured by Caterpillar.

Still referring to FIG. 1, each vehicle 12 may be provided with one or more sensors 20 for sensing various operational states and parameters associated with a wide variety of vehicle systems 18. Exemplary vehicle systems 18 that may be sensed by the sensors 20 include, but are not limited to, engine systems, cooling systems, hydraulic systems, transmission systems, and suspension systems. The vehicle sensors 20 may also sense information and data relating to the kinematic state of the vehicle 12, including vehicle position, speed, acceleration, and heading, although other information and data may be sensed as well.

In the particular embodiments shown and described herein, the vehicle sensors 20 may comprise a plurality of individual sensors (not shown) that are operatively associated with the various vehicle systems and devices 18 being monitored. The vehicle sensors 20 may also comprise a part of a vehicle information management system (VIMS) and associated vehicle data network or networks (not shown) that provide data sensing and reporting functionalities to facilitate the monitoring of the various vehicle components, states, and systems, as described herein. By way of example, such vehicle networks may include, but are not limited to, Local Interconnect Networks ("LIN," e.g., configured in accordance with ISO 1941 and ISO 17987), which are commonly used for low data rate applications; Controller Area Networks ("CAN," e.g., configured in accordance with ISO 11898) for medium data rate applications; and "FlexRay" (e.g., configured in accordance with ISO 17458), which is often used for safety-critical applications. A vehicle 12 may be provided with more than one vehicle network.

Before proceeding with the description, it should be noted that vehicle sensors 20 suitable for monitoring various vehicle components, systems, and states, are well-known in the art and are commonly provided as OEM equipment on a wide range of vehicles. Therefore, the particular vehicle sensors 20 that may be utilized in conjunction with the present invention will not be described in further detail herein.

Regardless of the particular types of vehicle sensors 20 that may be utilized on the vehicles 12, the vehicle sensors and associated vehicle network(s), as described above may be operatively connected to processing system 22 via network system 24. In many embodiments, network system 24 will comprise a combination of wireless and wired networks in order to facilitate the transfer of information and data from the vehicle sensors 20 to processing system 22. By way of example, in one embodiment, network system 24 may comprise a wireless network component (not separately shown) provided at the mine site 16. Such a wireless network may comprise a first link or component of network system 24 and may be used to capture and relay information and data from the vehicle sensors 20 to a local area network infrastructure (also not separately shown) provided at the mine site 16. Thereafter, another wide area network system (not shown) may be used transfer and/or relay that information and data to a centralized network infrastructure (also not shown) which may be operatively associated with processing system 22. Of course, other variations and configurations of network system 24 are possible, as would become apparent to persons having ordinary skill in the art after having become familiar with the teachings provided herein. Therefore, the network system 24 shown and described herein should not be regarded as limited to any particular components, types, architectures, or configurations.

Processing system 22 may be operatively connected to network system 24 so as to receive from the various vehicle sensors 20 information and data relating to the function and operation of the various vehicles 12 and systems thereof, as already described. Processing system 22 processes that information and data in accordance with the teachings provided herein in order to improve the operation of the fleet of off-road vehicles 12. Processing system 22 may also be connected to one or more display systems 30 to allow the processing system 22 to display certain information and data relating to the user defined events 26 described herein to be displayed or presented to one or more system operators, as described herein. Both processing system 22 and display system 30 may comprise any of a wide range of systems and devices that are now known in the art or that may be developed in the future that are or would be suitable for use with the present invention. Still further, because such systems are well-known in the art and could be readily provided by persons having ordinary skill in the art, the particular processing and display systems 22 and 30 that may be utilized in conjunction with the present invention will not be described in further detail herein.

Figure 3:
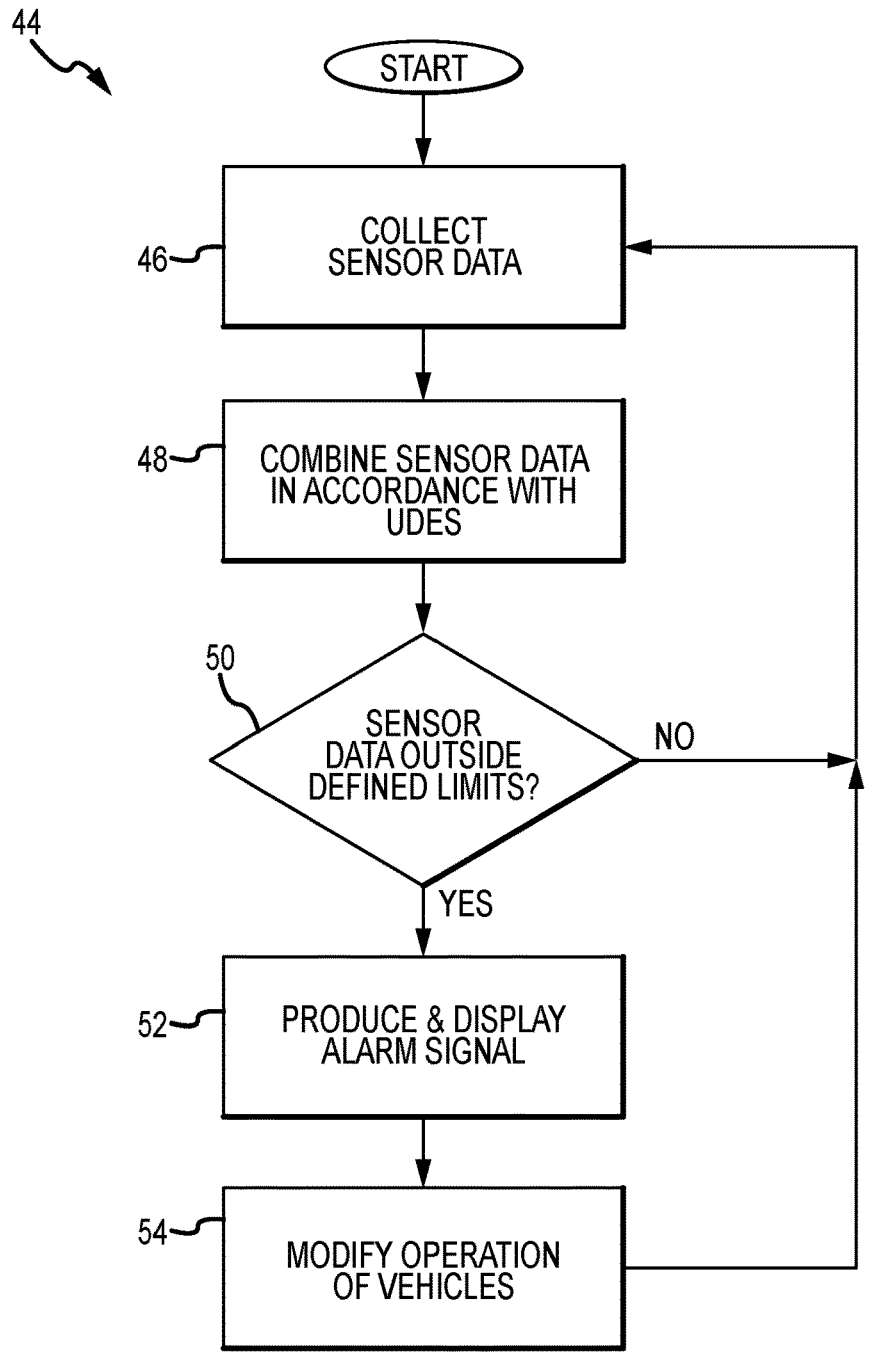
FIG. 3 is a flow chart representation of an embodiment of a method of operating a fleet of off-road vehicles.

Referring now primarily to FIG. 3, the various components of the system 10 may be configured or programmed to operate in accordance with a method 44 to improve the operation of a fleet of off-road vehicles 12. Broadly speaking, method 44 generally involves collecting (e.g., during step 46) sensor data from the vehicles 12. As mentioned, the sensor data may comprise information and data relating to any of a wide range of vehicle systems 18. Thereafter, during step 48 the sensor data may be combined in accordance with one or more user-defined events or UDEs 26.

As mentioned, each user-defined event or UDE 26 may define a combination of sensor data relating to at least two vehicle systems 18. The user-defined event or UDE 26 may also include defined limits for that sensor data. Further, some UDEs 26 may comprise combinations of sensor data that are indicative of a mechanical deficiency of the off-road vehicle 12, whereas other UDEs 26 may be indicative of an operational deficiency (i.e., improper operator technique or procedure). The developed UDE's may also be assigned a priority number (e.g., from priority 1 to priority 5) depending on the importance or potential impact on the vehicle 12 of a UDE alarm condition. Moreover, the same UDE 26 may be assigned different priority numbers depending on the particular type or model of the vehicle 12, as best seen in the Table.

The various exemplary user-defined events or UDEs 26 described herein were defined or created for various types of off-road vehicles manufactured by Caterpillar, Inc., of Peoria, Ill. (US). In particular, the various exemplary UDEs 26 described herein were developed for Caterpillar model 793 (types B, C, and D) off-road haul trucks and for the Caterpillar model 994 (type F) wheel loader. Alternatively, UDEs 26 could be developed for other types of off-road vehicles made by other manufacturers as would become readily apparent to persons having ordinary skill in the art after having become familiar with the teachings provided herein. Consequently, the present invention should not be regarded as limited to use with any particular type of off-road vehicle 12.

The Caterpillar off-road vehicles described herein include a comprehensive sensor suite for sensing information and data relating to a wide variety of vehicle systems 18, as already described herein. Those sensors 20 are operatively associated with the vehicle information management system (VIMS). While the manufacturer has defined various permissible limits (e.g., pressures, temperatures, etc.) for the various systems, we have found that information and/or data from a single sensor 20 (or sensors 20 associated with a single vehicle system 18) are not necessarily indicative of mechanical or operational deficiencies of the off-road vehicle 12. Each UDE 26 defines a combination of sensor data that relates to at least two vehicle systems or vehicle sensors as well as defined limits for that sensor data. The defined limits and user-defined event 26 are indicative of undesirable operation of the off-road vehicles in a way that data from single sensors 20 or vehicle systems 18 are not. Some UDEs 26 may be defined that are indicative of a mechanical deficiency or possible need for maintenance of the off-road vehicle 12. Other UDEs 26 may be defined that indicative of an operational deficiency (i.e., improper operator technique or procedure).

By way of example, UDE's 26 may be defined as follows in the following Table. Alarm IDs having a '793' prefix are for the haul trucks 14, whereas Alarm IDs having a '994' prefix are for the wheel loaders 15:

TABLE

| Alarm ID | Priority | UDE Message | Alarm Logic |
|---|---|---|---|
| 793_003 | 3 | Park Brake Not Set While Waiting | (Parking Brake-Off) AND (Transmission-Neutral) |
| 793_004 | 3 | Park Brake Not Set While Loading | (Parking Brake-Off) AND (Payload Status-Loading) |
| 793_008 | 4 | Bed Up Switch Bad | (Bed Up Indication) AND (Haul Distance > 20) |
| 793_016 | 2 | R. Front minus L. Front Brake Temp High | (Ground Speed > 5) AND NOT (Transmission-Neutral) AND [(retardermode = 2) OR (retardermode = 6) OR (retarder2! = 0) OR (servicebrakestatus! = 0)] AND (ABS(R. Front minus L. Front Brake Temp) > 25) |
| 793_017 | 2 | R. Rear minus L. Rear Brake Temp High | Ground Speed > 5) AND NOT (Transmission-Neutral) AND [(retardermode = 2) OR (retardermode = 6) OR (retarder2! = 0) OR (servicebrakestatus! = 0)] AND (Engine Coolant Temperature > 145) AND (ABS(R. Rear minus L. Rear Brake Temp) > 25) |
| 793_018 | 2 | Front minus Rear Brake Temp High | Ground Speed > 5) AND NOT (Transmission-Neutral) AND [(retardermode = 2) OR (retardermode = 6) OR (servicebrake = 1) OR (retarder2 = 1) AND (Engine Coolant Temperature > 145) AND (ABS((LF Brake Temp + RF Brake Temp) − (LR Brake Temp + RR Brake Temp)) > 50 |
| 793_025 | 3 | ARC (auto. retarder control) Switch Status OFF | (Retarder Mode = 0 OR Retarder Mode = 6) AND (Ground Speed > 0) |
| 793_026 | 2 | Traction Control Sensor Problem | (Ground Speed > 2) AND ((Left Rear Wheel Speed < 0.1) OR (Right Rear Wheel Speed < 0.1)) |
| 793_027 | 2 | Right minus Left Exhaust Temp High | (ABS(Right Minus Left Exhaust Temp >= 81)) |
| 793_028 | 5(Type B/C) 2(Type D) | Front/Rear Aftercooler Delta High | (Engine Speed > 700) AND (Engine Coolant Temperature > 145) AND (ABS((Front Aftercooler Temperature − Rear Aftercooler Temperature)) > 50) |
| 793_033 | 2 | Boost Pressure Below 25 psi | ((Engine Speed > 1400) OR (Engine Speed < 1800)) AND (Engine Load > 98) AND (Ground Speed < 7) AND (Throttle Position > 95) AND ((Boost Pressure >= 20) AND (Boost Pressure <= 25)) AND (Transmission Gear < 147) |
| 793_035 | 2 | Transmission Oil Level Low | (Engine Speed > 700) AND (Transmission Oil Level = Low) AND (Transmission Lube Temp > 158) AND NOT (Payload Status = Dumping) |
| 793_036 | 1 | Engine Oil Pressure Low | EngOilPressHighRPM: [Engine Oil Pressure] < 50 EngOilPressLowRPM: [Engine Oil Pressure] < 33 EngSpeedHighRPM: [Engine Speed] > 1500 EngSpeedLowRPM: ([Engine Speed] > 650) AND ([Engine Speed] < 1500) Alarm: ([EngSpeedLowRPM] AND [EngOilPressLowRPM]) OR ([EngSpeedHighRPM] AND [EngOilPressHighRPM]) |
| 793_038 | 3 | Excessive Idle Time | Engine Speed >= 100 AND Parking Brake = On AND Transmission Gear = Neutral AND Data Age < 5 |
| 994_003 | 2 | Right minus Left Exhaust Temp High | (Right Minus Left Exhaust Temp >= 50) |

After the sensor data has been combined in accordance with the UDEs 26, method 44 may then proceed to step 50 to determine whether the sensor data are inside or outside the defined limits of the UDEs 26. If they are not, the program flow returns to step 46 and continues to collect sensor data and combine them in accordance with the UDEs 26. If, however, the sensor data are outside the limits defined by the UDEs 26, then an alarm signal 32 is produced at step 52. Alarm signal 32 may then be displayed on display system 30 in the manner already described. See FIG. 2. Alarm signal 32 could also include an aural alarm signal. Thereafter, at step 54, a system operator or fleet manager (not shown) may modify the operation of the off-road vehicle 12, e.g., by scheduling appropriate maintenance operations and/or operator training, depending on the particular alarm.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:
1. A method of improving the operation of a fleet of off-road vehicles, comprising:
   creating a user-defined event, the user-defined event defining a combination of sensor data relating to at least two vehicle systems and defined limits for the sensor data, the defined limits and user-defined event being indicative of undesirable operation of the off-road vehicles;
   collecting sensor data from the vehicles, the sensor data being related to the operation of a plurality of vehicle systems;
   combining sensor data from the vehicle systems in accordance with the user-defined event;
   determining whether the collected and combined sensor data are within or without the defined limits of the user-defined event;

producing an alarm signal for a user when the collected and combined sensor data are without the defined limits of the user-defined event; and modifying the operation of vehicles for which an alarm signal has been produced.

2. The method of claim 1, wherein said creating a user-defined event comprises defining combinations of sensor data that are indicative of a mechanical deficiency of the off-road vehicles.

3. The method of claim 2, wherein said creating a user-defined event comprises defining combinations of sensor data that are indicative of an operational deficiency of the off-road vehicles.

4. The method of claim 3, wherein said producing an alarm signal further comprises producing an indication of whether the alarm signal is indicative of a mechanical deficiency or an operational deficiency.

5. The method of claim 4, wherein said modifying the operation of the vehicles for which an alarm signal has been produced, further comprises:

scheduling a maintenance operation for the vehicles when the alarm signal is indicative of a mechanical deficiency; and scheduling operator training when the alarm signal is indicative of an operational deficiency.

6. A method of operating a fleet of off-road vehicles, comprising:

collecting sensor data from the off-road vehicles, the sensor data being related to the operation of a plurality of vehicle systems;

combining sensor data from the vehicle systems in accordance with a user-defined event;

determining whether the collected and combined sensor data are within or without defined limits of the user-defined event;

producing an alarm signal for a user when the collected and combined sensor data are without the defined limits of the user-defined event; and modifying the operation of vehicles for which an alarm signal has been produced.

7. The method of claim 6, wherein the predetermined user-defined event comprises combinations of sensor data that are indicative of a mechanical deficiency of the off-road vehicles and combinations of sensor data that are indicative of an operational deficiency of the off-road vehicles, and wherein said producing an alarm signal further comprises producing an indication of whether the alarm signal is indicative of a mechanical deficiency or an operational deficiency.

8. The method of claim 7, wherein said modifying the operation of the vehicles for which an alarm signal has been produced, further comprises:

scheduling a maintenance operation for the vehicles when the alarm signal is indicative of a mechanical deficiency; and scheduling operator training when the alarm signal is indicative of an operational deficiency.

9. The method of claim 6, wherein collecting sensor data from the off-road vehicles comprises collecting data from a vehicle information management system provided on the off-road vehicles.

* * * * *